(12) United States Patent
Cho et al.

(10) Patent No.: US 9,512,902 B2
(45) Date of Patent: Dec. 6, 2016

(54) MULTI-STAGE TRANSMISSION FOR VEHICLE

(71) Applicant: Hyundai Motor Company, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/713,153

(22) Filed: May 15, 2015

(65) Prior Publication Data

US 2016/0146298 A1 May 26, 2016

(30) Foreign Application Priority Data

Nov. 26, 2014 (KR) .......................... 10-2014-0166593

(51) Int. Cl.
*F16H 3/66* (2006.01)

(52) U.S. Cl.
CPC .......... *F16H 3/66* (2013.01); *F16H 2200/0073* (2013.01); *F16H 2200/2012* (2013.01); *F16H 2200/2046* (2013.01); *F16H 2200/2097* (2013.01)

(58) Field of Classification Search
CPC ................ F16H 2200/2046; F16H 2200/2012; F16H 2200/0073

USPC .......................................... 475/275–291, 330
See application file for complete search history.

(56) References Cited

U.S. PATENT DOCUMENTS

| 8,303,455 | B2 | 11/2012 | Gumpoltsberger et al. |
| 2008/0242490 | A1* | 10/2008 | Phillips ..................... F16H 3/66 475/276 |
| 2009/0017970 | A1* | 1/2009 | Hukill ..................... F16H 3/666 475/275 |
| 2009/0036256 | A1* | 2/2009 | Hukill ..................... F16H 3/666 475/276 |

FOREIGN PATENT DOCUMENTS

| KR | 10-2010-0018699 (A) | 2/2010 | |
| KR | 10-2013-0077146 (A) | 7/2013 | |
| KR | 10-1283035 B1 | 7/2013 | |
| KR | 10-1317142 B1 | 10/2013 | |
| KR | 101459477 B1 * | 11/2014 | ............... F16H 3/66 |

* cited by examiner

*Primary Examiner* — Roger Pang
(74) *Attorney, Agent, or Firm* — Morgan, Lewis & Bockius LLP

(57) ABSTRACT

A multi-stage transmission for a vehicle may include an input shaft and an output shaft, a first planetary gear device, a second planetary gear device, a third planetary gear device, and a fourth planetary gear device provided between the input shaft and the output shaft so as to transfer a torque and each including three rotating elements, and at least six shifting elements connected to the rotating elements of the first to fourth planetary gear devices.

6 Claims, 2 Drawing Sheets

*FIG. 2*

| SHIFTING POSITION | CL1 | CL2 | CL3 | CL4 | CL5 | CL6 | GEAR RATIO |
|---|---|---|---|---|---|---|---|
| 1ST | O | O | | | | O | 6.089 |
| 2ND | | O | | O | | O | 5.173 |
| 3RD | O | O | | O | | | 4.714 |
| 4TH | | O | O | O | | | 3.143 |
| 5TH | | O | | O | O | | 2.128 |
| 6TH | | | O | O | O | | 1.279 |
| 7TH | O | | | O | O | | 1.000 |
| 8TH | O | | O | | O | | 0.793 |
| 9TH | | | O | | O | O | 0.667 |
| 10TH | O | | O | | | O | 0.351 |
| 11TH | | | O | O | | O | 0.180 |
| REV | O | O | | | O | | 3.045 |

MULTI-STAGE TRANSMISSION FOR VEHICLE

CROSS REFERENCE TO RELATED APPLICATION

The present application claims priority to Korean Patent Application No. 10-2014-0166593, filed Nov. 26, 2014, the entire contents of which is incorporated herein for all purposes by this reference.

BACKGROUND OF THE INVENTION

Field of the Invention

The present invention relates to a multi-stage transmission for a vehicle, and more particularly, to a multi-stage transmission technology able to realize as many shifting stages as possible using the fewest parts possible and the simplest configuration possible, thereby improving fuel efficiency of a vehicle.

Description of Related Art

Recent rising oil prices have driven worldwide car manufacturers into unlimited competition to improve fuel efficiency. In addition, great efforts have been made to reduce the weight and improve the fuel efficiency of engines based on a variety of techniques such as downsizing.

Among methods that can be sought for transmissions equipped in vehicles to improve fuel efficiency, there is a method allowing an engine to operate at more efficient operation points using a multi-stage transmission, thereby ultimately improving the fuel efficiency.

Such a multi-stage transmission allows an engine to operate in a relatively low RPM (revolutions per minute) range, thereby further improving the quietness of a vehicle.

However, as the number of shifting stages of a transmission increases, the number of internal parts constituting the transmission also increases. This may lead to undesirable effects instead, such as the reduced mountability and transfer efficiency and the increased cost and weight of the transmission. Therefore, in order to maximize the effect of improved fuel efficiency using the multi-staging of a transmission, it is important to devise a transmission structure able to realize maximum efficiency using a relatively small number of parts and a simple configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi-stage transmission for a vehicle capable of maximizing fuel efficiency improvement of the vehicle through driving at an optimal driving point of an engine and improving silence of the vehicle through more silent driving of the engine by implementing at least eleven forward stages and one reverse stage or more by a comparatively small number of components and a simple configuration.

According to various aspects of the present invention, a multi-stage transmission for a vehicle may include an input shaft and an output shaft, a first planetary gear device, a second planetary gear device, a third planetary gear device, and a fourth planetary gear device provided between the input shaft and the output shaft so as to transfer a torque and each including three rotating elements, and at least six shifting elements connected to the rotating elements of the first to fourth planetary gear devices, in which a first rotating element of the first planetary gear device may be selectively connected to each of a first rotating element and a second rotating element of the second planetary gear device and a third rotating element of the third planetary gear device, a second rotating element thereof may be continuously connected to a second rotating element of the third planetary gear device, and a third rotating element thereof may be selectively connected to the third rotating element of the third planetary gear device, the first rotating element of the second planetary gear device may be fixably installed by any one of the shifting elements, the second rotating element thereof may be continuously connected to the input shaft, and a third rotating element thereof may be continuously connected to a first rotating element of the third planetary gear device, the first rotating element of the third planetary gear device may be continuously connected to a first rotating element of the fourth planetary gear device and the second rotating element thereof may be continuously connected to a third rotating element of the fourth planetary gear device, and a second rotating element of the fourth planetary gear device may be continuously connected to the output shaft and the third rotating element thereof may be fixably installed by another of the shifting elements.

The first planetary gear device, the second planetary gear device, the third planetary gear device, and the fourth planetary gear device may be sequentially disposed in an axial direction of the input shaft and the output shaft.

The first rotating element of the second planetary gear device may be fixably installed to a transmission case by a third clutch among the shifting elements, the third rotating element of the fourth planetary gear device may be fixably installed to the transmission case by a second clutch among the shifting elements, and the others among the shifting elements are configured so as to form selective connection structures between the rotating elements of the planetary gear devices.

A fourth clutch among the shifting elements may form the selective connection structure between the first rotating element of the first planetary gear device and the first rotating element of the second planetary gear device, a first clutch among the shifting elements may form the selective connection structure between the first rotating element of the first planetary gear device and the second rotating element of the second planetary gear device, a fifth clutch among the shifting elements may form the selective connection structure between the first rotating element of the first planetary gear device and the third rotating element of the third planetary gear device, and a sixth clutch among the shifting elements may form the selective connection structure between the third rotating element of the first planetary gear device and the third rotating element of the third planetary gear device.

According to various aspects of the present invention, a multi-stage transmission for a vehicle may include a first planetary gear device, a second planetary gear device, a third planetary gear device, and a fourth planetary gear device, each having three rotating elements, six shifting elements configured so as to selectively provide frictional force, and eight shafts connected to the rotating elements of the planetary gear devices, in which a first shaft may be an input shaft connected in series with a second rotating element of the second planetary gear device, a second shaft may be connected in series with a first rotating element of the second planetary gear device, a third shaft may be connected in series with a first rotating element of the first planetary gear device, a fourth shaft may be connected in series with a third rotating element of the first planetary gear device, a fifth shaft may be connected in series with a second rotating element of the first planetary gear device, a second rotating element of the third planetary gear device, and a third rotating element of the fourth planetary gear device, a sixth shaft may be connected in series with a third rotating element of the second planetary gear device, a first rotating element of the third planetary gear device, and a first rotating element of the fourth planetary gear device, a seventh shaft may be connected in series with a third rotating element of the third planetary gear device, and an eighth shaft may be an output shaft connected in series with a second rotating element of the fourth planetary gear device, in which a first clutch among the six shifting elements may be installed between the first shaft and the third shaft, a second clutch among the six shifting elements may be installed between the fifth shaft and a transmission case, a third clutch among the six shifting elements may be installed between the second shaft and the transmission case, a fourth clutch among the six shifting elements may be installed between the second shaft and the third shaft, a fifth clutch among the six shifting elements may be installed between the third shaft and the seventh shaft, and a sixth clutch among the six shifting elements may be installed between the fourth shaft and the seventh shaft.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operation modes of the exemplary multi-stage transmission for the vehicle of FIG. 1.

Figure 1:
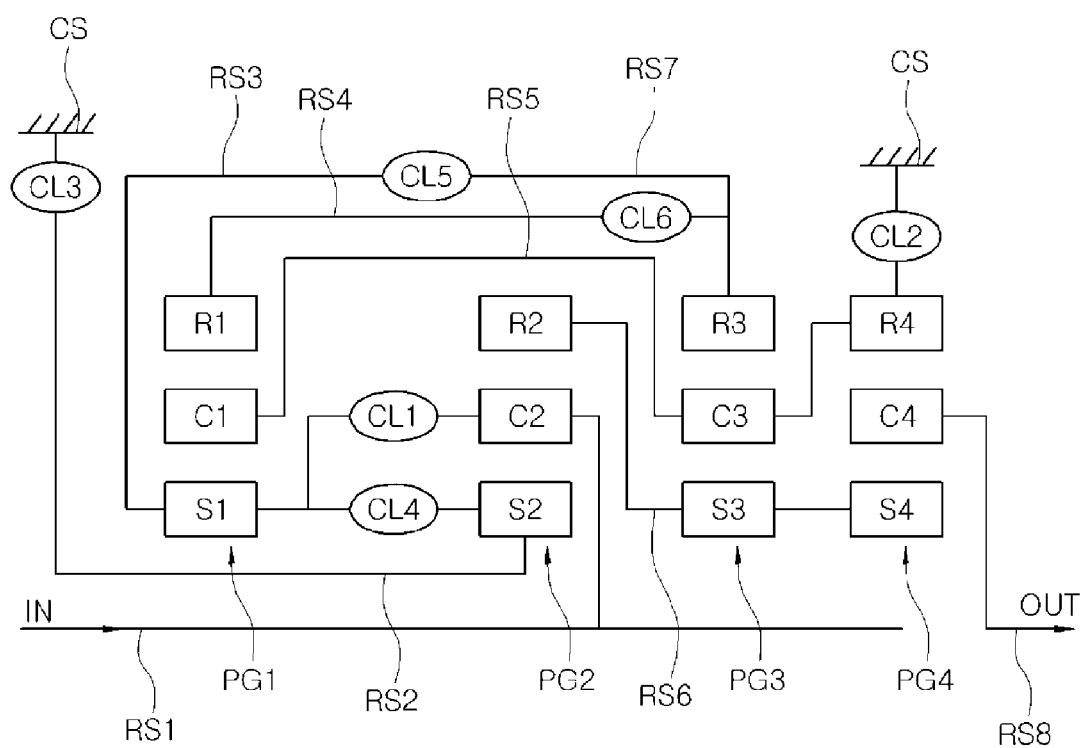
FIG. 1 is a configuration diagram showing an exemplary multi-stage transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1 and FIG. 2, a multi-stage transmission for a vehicle according to various embodiments of the present invention is configured to include an input shaft IN and an output shaft OUT, a first planetary gear device PG1, a second planetary gear device PG2, a third planetary gear device PG3, and a fourth planetary gear device PG4 provided between the input shaft IN and the output shaft OUT so as to transfer a torque and each including three rotating elements, and at least six shifting elements connected to the rotating elements of the first to fourth planetary gear devices.

A first rotating element S1 of the first planetary gear device PG1 is selectively connected to each of a first rotating element S2 and a second rotating element C2 of the second planetary gear device PG2 and a third rotating element R3 of the third planetary gear device PG3, a second rotating element C1 thereof is continuously connected to a second rotating element C3 of the third planetary gear device PG3, and a third rotating element R1 thereof is selectively connected to the third rotating element R3 of the third planetary gear device PG3.

The first rotating element S2 of the second planetary gear device PG2 is fixably installed by any one of the shifting elements, the second rotating element C2 thereof is continuously connected to the input shaft IN, and a third rotating element R2 thereof is continuously connected to a first rotating element S3 of the third planetary gear device PG3.

The first rotating element S3 of the third planetary gear device PG3 is continuously connected to a first rotating element S4 of the fourth planetary gear device PG4 and the second rotating element C3 thereof is continuously connected to a third rotating element R4 of the fourth planetary gear device PG4, and a second rotating element C4 of the fourth planetary gear device PG4 is continuously connected to the output shaft OUT and the third rotating element R4 thereof is fixably installed by another of the shifting elements.

The first planetary gear device PG1, the second planetary gear device PG2, the third planetary gear device PG3, and the fourth planetary gear device PG4 are sequentially disposed in an axial direction of the input shaft IN and the output shaft OUT.

The first rotating element S2 of the second planetary gear device PG2 is fixably installed to a transmission case CS by a third clutch CL3 among the shifting elements, and the third rotating element R4 of the fourth planetary gear device PG4 is fixably installed to the transmission case CS by a second clutch CL2 among the shifting elements.

Therefore, the third clutch CL3 and the second clutch CL2 serve as brakes, respectively, to serve to restrict or allow rotation of the first rotating element S2 of the second planetary gear device PG2 and the third rotating element R4 of the fourth planetary gear device PG4, respectively.

The others among the shifting elements are configured so as to form selective connection structures between the rotating elements of the planetary gear devices.

That is, a fourth clutch CL4 among the shifting elements forms the selective connection structure between the first rotating element S1 of the first planetary gear device PG1 and the first rotating element S2 of the second planetary gear device PG2, a first clutch CL1 among the shifting elements forms the selective connection structure between the first rotating element S1 of the first planetary gear device PG1 and the second rotating element C2 of the second planetary gear device PG2, a fifth clutch CL5 among the shifting elements forms the selective connection structure between the first rotating element S1 of the first planetary gear device PG1 and the third rotating element R3 of the third planetary gear device PG3, and a sixth clutch CL6 among the shifting elements forms the selective connection structure between the third rotating element R1 of the first planetary gear device PG1 and the third rotating element R3 of the third planetary gear device PG3.

In various embodiments, the first rotating element S1, the second rotating element C1, and the third rotating element R1 of the first planetary gear device PG1 are a first sun gear, a first carrier, and a first ring gear, respectively, the first rotating element S2, the second rotating element C2, and the third rotating element R2 of the second planetary gear device PG2 are a second sun gear, a second carrier, and a second ring gear, respectively, the first rotating element S3, the second rotating element C3, and the third rotating element R3 of the third planetary gear device PG3 are a third sun gear, a third carrier, and a third ring gear, respectively, and the first rotating element S4, the second rotating element C4, and the third rotating element R4 of the fourth planetary gear device PG4 are a fourth sun gear, a fourth carrier, and a fourth ring gear, respectively.

The multi-stage transmission for a vehicle configured as described above may also be represented as follows.

That is, the multi-stage transmission for a vehicle according to various embodiments of the present invention is configured to include the first planetary gear device PG1, the second planetary gear device PG2, the third planetary gear device PG3, and the fourth planetary gear device PG4 each having three rotating elements, the six shifting elements configured so as to selectively provide frictional force, and eight shafts connected to the rotating elements of the planetary gear devices.

Here, a first shaft RS1 is the input shaft IN connected in series with the second rotating element C2 of the second planetary gear device PG2, a second shaft RS2 is connected in series with the first rotating element S2 of the second planetary gear device PG2, a third shaft RS3 is connected in series with the first rotating element S1 of the first planetary gear device PG1, a fourth shaft RS4 is connected in series with the third rotating element R1 of the first planetary gear device PG1, a fifth shaft RS5 is connected in series with the second rotating element C1 of the first planetary gear device PG1, the second rotating element C3 of the third planetary gear device PG3, and the third rotating element R4 of the fourth planetary gear device PG4, a sixth shaft RS6 is connected in series with the third rotating element R2 of the second planetary gear device PG2, the first rotating element S3 of the third planetary gear device PG3, and the first rotating element S4 of the fourth planetary gear device PG4, a seventh shaft RS7 is connected in series with the third rotating element R3 of the third planetary gear device PG3, and an eighth shaft RS8 is the output shaft OUT connected in series with the second rotating element C4 of the fourth planetary gear device PG4.

In addition, the first clutch CL1 among the six shifting elements is installed between the first shaft RS1 and the third shaft RS3, the second clutch CL2 among the six shifting elements is installed between the fifth shaft RS5 and the transmission case CS, the third clutch CL3 among the six shifting elements is installed between the second shaft RS2 and the transmission case CS, the fourth clutch CL4 among the six shifting elements is installed between the second shaft RS2 and the third shaft RS3, the fifth clutch CL5 among the six shifting elements is installed between the third shaft RS3 and the seventh shaft RS7, and the sixth clutch CL6 among the six shifting elements is installed between the fourth shaft RS4 and the seventh shaft RS7.

Since the multi-stage transmission for a vehicle according to various embodiments of the present invention including the four simple planetary gear devices and the six shifting elements as described above may implement eleven forward stages and one reverse stage depending on an operation mode table as shown in FIG. 2, it may implement a multi-stage shifting stage of eleven stages by a relatively small number of components and a simple configuration to contribute to improvement of fuel efficiency and silence of the vehicle, thereby making it possible to improve salability of the vehicle.

As set forth above, according to various embodiments of the present invention, at least eleven forward stages and one reverse stage or more are implemented by a comparatively small number of components and a simple configuration, thereby making it possible to maximize fuel efficiency improvement of the vehicle through driving at an optimal driving point of an engine and improve silence of the vehicle through more silent driving of the engine.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A multi-stage transmission for a vehicle, comprising:
an input shaft and an output shaft;
a first planetary gear device, a second planetary gear device, a third planetary gear device, and a fourth planetary gear device provided between the input shaft and the output shaft so as to transfer a torque and each including three rotating elements; and
at least six shifting elements connected to the rotating elements of the first to fourth planetary gear devices,
wherein a first rotating element of the first planetary gear device is selectively connected to each of a first rotating element and a second rotating element of the second planetary gear device and a third rotating element of the third planetary gear device, a second rotating element of the first planetary gear device is continuously connected to a second rotating element of the third planetary gear device, and a third rotating element of the first planetary gear device is selectively connected to the third rotating element of the third planetary gear device;
the first rotating element of the second planetary gear device is fixably installed by one of the shifting elements, the second rotating element of the second planetary gear device is continuously connected to the input shaft, and a third rotating element of the second planetary gear device is continuously connected to a first rotating element of the third planetary gear device;
the first rotating element of the third planetary gear device is continuously connected to a first rotating element of the fourth planetary gear device and the second rotating element of the third planetary gear device is continuously connected to a third rotating element of the fourth planetary gear device; and a second rotating element of the fourth planetary gear device is continuously connected to the output shaft and the third rotating element of the fourth planetary gear device is fixably installed by another of the shifting elements.

2. The multi-stage transmission for a vehicle of claim 1, wherein the first planetary gear device, the second planetary gear device, the third planetary gear device, and the fourth planetary gear device are sequentially disposed in an axial direction of the input shaft and the output shaft.

3. The multi-stage transmission for a vehicle of claim 2, wherein the first rotating element of the second planetary gear device is fixably installed to a transmission case by a third clutch among the shifting elements;

the third rotating element of the fourth planetary gear device is fixably installed to the transmission case by a second clutch among the shifting elements; and the others among the shifting elements are configured so as to form selective connection structures between the rotating elements of the planetary gear devices.

4. The multi-stage transmission for a vehicle of claim 3, wherein a fourth clutch among the shifting elements forms the selective connection structure between the first rotating element of the first planetary gear device and the first rotating element of the second planetary gear device;

a first clutch among the shifting elements forms the selective connection structure between the first rotating element of the first planetary gear device and the second rotating element of the second planetary gear device;

a fifth clutch among the shifting elements forms the selective connection structure between the first rotating element of the first planetary gear device and the third rotating element of the third planetary gear device; and a sixth clutch among the shifting elements forms the selective connection structure between the third rotating element of the first planetary gear device and the third rotating element of the third planetary gear device.

5. A multi-stage transmission for a vehicle, comprising:

a first planetary gear device, a second planetary gear device, a third planetary gear device, and a fourth planetary gear device, each having three rotating elements;

six shifting elements configured so as to selectively provide frictional force; and eight shafts connected to the rotating elements of the planetary gear devices, wherein a first shaft is an input shaft connected in series with a second rotating element of the second planetary gear device;

a second shaft is connected in series with a first rotating element of the second planetary gear device;

a third shaft is connected in series with a first rotating element of the first planetary gear device;

a fourth shaft is connected in series with a third rotating element of the first planetary gear device;

a fifth shaft is connected in series with a second rotating element of the first planetary gear device, a second rotating element of the third planetary gear device, and a third rotating element of the fourth planetary gear device;

a sixth shaft is connected in series with a third rotating element of the second planetary gear device, a first rotating element of the third planetary gear device, and a first rotating element of the fourth planetary gear device;

a seventh shaft is connected in series with a third rotating element of the third planetary gear device; and an eighth shaft is an output shaft connected in series with a second rotating element of the fourth planetary gear device, and wherein a first clutch among the six shifting elements is installed between the first shaft and the third shaft, a second clutch among the six shifting elements is installed between the fifth shaft and a transmission case, a third clutch among the six shifting elements is installed between the second shaft and the transmission case, a fourth clutch among the six shifting elements is installed between the second shaft and the third shaft, a fifth clutch among the six shifting elements is installed between the third shaft and the seventh shaft, and a sixth clutch among the six shifting elements is installed between the fourth shaft and the seventh shaft.

6. The multi-stage transmission for a vehicle of claim 5, wherein the first planetary gear device, the second planetary gear device, the third planetary gear device, and the fourth planetary gear device are sequentially disposed in an axial direction of the input shaft and the output shaft.

* * * * *